United States Patent
Brundisini et al.

(10) Patent No.: US 6,176,264 B1
(45) Date of Patent: Jan. 23, 2001

(54) PROGRAMMABLE ELECTRONIC SELF-LEARNING TIMER FOR THE CONTROL OF A SOLENOID VALVE, PARTICULARLY FOR WATERING SYSTEMS

(75) Inventors: Andrea Brundisini, Bologna; Gianfranco Roman, Pasiano, both of (IT)

(73) Assignee: Claber S.p.A. (IT)

(*) Notice: Under 35 U.S.C. 154(b), the term of this patent shall be extended for 0 days.

(21) Appl. No.: 09/451,550

(22) Filed: Dec. 1, 1999

(30) Foreign Application Priority Data

Dec. 3, 1998 (IT) .............................................. MI98A2620

(51) Int. Cl.[7] .................................................. A01G 27/00
(52) U.S. Cl. .......................................... 137/624.11; 239/69
(58) Field of Search ........................ 137/624.11, 624.13; 239/69, 70

(56) References Cited

U.S. PATENT DOCUMENTS 4,176,395 * 11/1979 Evelyn-Veere et al. ..... 137/624.11 X
5,272,620 * 12/1993 Mock et al. ........................ 239/69 X
5,921,280 * 7/1999 Erickson et al. ................ 137/624.11

* cited by examiner

Primary Examiner—Kevin Lee
(74) Attorney, Agent, or Firm—Akerman Senterfitt

(57) ABSTRACT

There is described a programmable electronic timer for the control of a solenoid valve, particularly for watering systems. The timer comprises a start button, a stop button and a programmable processing unit. The latter is preset to determine, as a consequence to the operation on said start button, the opening of the controlled solenoid valve and the starting of a time count and, as a consequence to the operation on said stop button, the closing of the solenoid valve and the end of said time count with memorisation of the counted time for the subsequent automatic control of the opening and closing of the solenoid valve in the next days at the same time and for the same watering length of time.

7 Claims, 1 Drawing Sheet

PROGRAMMABLE ELECTRONIC SELF-LEARNING TIMER FOR THE CONTROL OF A SOLENOID VALVE, PARTICULARLY FOR WATERING SYSTEMS

The present invention concerns a programmable electronic self-learning timer for the control of a solenoid valve, particularly for watering systems.

For the maintenance of lawns, gardens, kitchen gardens and other cultivated spaces the use of automatic watering systems based on solenoid valves controlled so as to open and close at pre-established moments in the course of a day or, more commonly, on different days, whether consecutive or not are increasingly widespread.

For the control of watering systems more or less complex timer devices, that are programmable as a function of the needs of the system and of the relative user are utilised.

Object of the present invention is to realise a programmable electronic timer that is capable to meet the needs of those users who require a daily, always the same, activation of their watering system and who want particularly simple and elementary actuating and programming operations.

According to the invention such object has been attained with a programmable electronic timer for the control of a solenoid valve, particularly but not exclusively for watering systems, comprising a start button, a stop button and a programmable processing unit, characterized in that said programmable processing unit is preset to determine, as a consequence of the operation on said start button, the opening of the controlled solenoid valve and the starting of a time count and, as a consequence of the operation on said stop button, the closing of the solenoid valve and the end of said time count with the memorisation of the counted time for the next automatic control for the opening and closing of the solenoid valve on the following days, at the same time and for the same watering time.

In other words, the timer according to the invention operates in the self-learning way, that is a single operation for the start and stop of the solenoid valve for a desired time determines the memorisation of the same operation in the form of a watering program that is automatically repeatable each day in the same way and for the same length of time.

The user must therefore operate the timer only once, simply by first pressing a start button and then a stop button, in order to obtain the desired programming also for the next days, without having to additionally operate on the timer.

These and other characteristics of the present invention will be made evident from the following detailed description of a possible embodiment that is illustrated as a not limiting example in the enclosed drawings, in which:

DETAILED DESCRIPTION OF THE INVENTION

Figure 1:
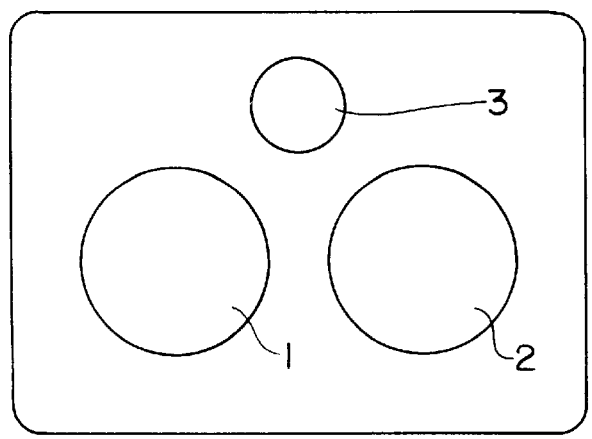
FIG. 1 shows the control panel of a timer according to the invention.

The timer illustrated in the drawings has a control panel as the one shown in FIG. 1, that is with a start button 1 (for example green in colour), a stop button 2 (for example red in colour) and a LED type optical indicator 3.

Figure 2:
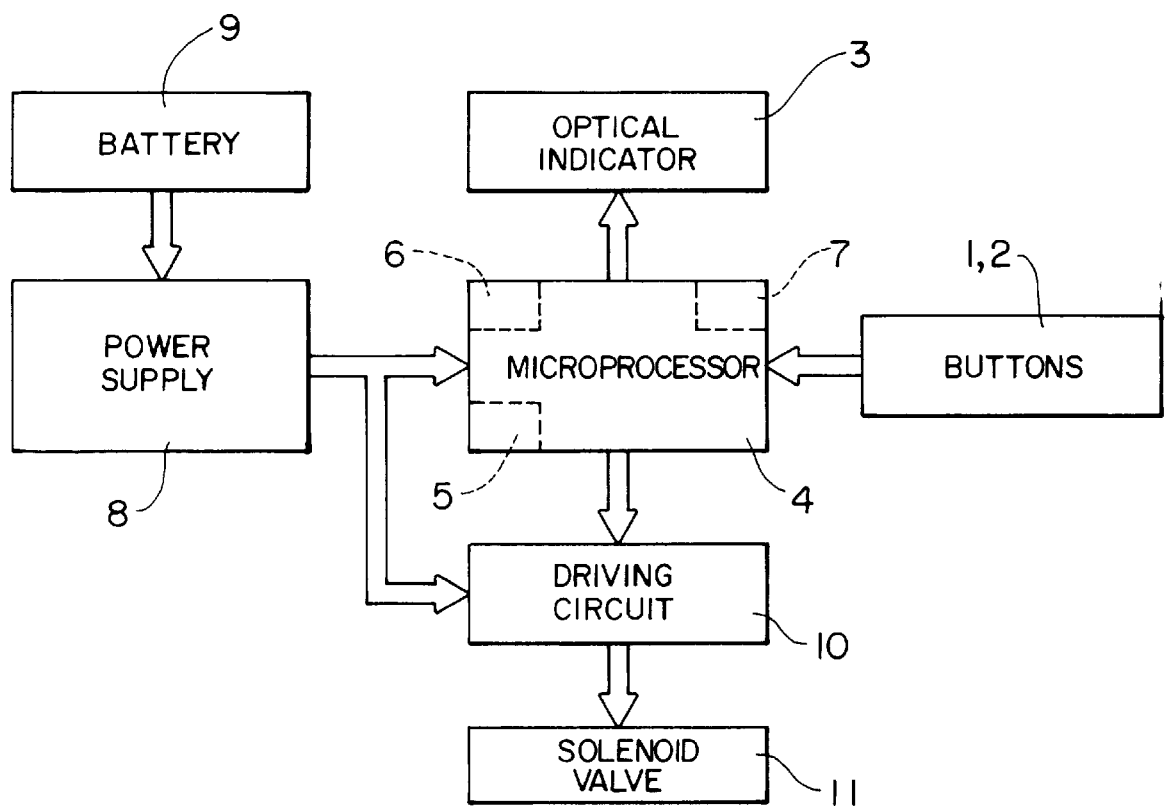
FIG. 2 shows a block diagram representing the internal electronic circuit of the timer according to the invention.

In addition, the timer comprises an internal electronic circuit that is schematically illustrated in FIG. 2 and it includes in turn a logic processing unit consisting of a microprocessor 4 provided with an internal timer 5, with an internal counter 6 and with an internal RAM memory 7, all made by software. The microprocessor 4 is electrically supplied by a power supply 8 with battery 9 and it receives its controls from the aforementioned buttons 1 and 2. In turn it controls the driving circuit 10 of a bistable type solenoid valve 11 and the lighting up of the optical indicator 3.

The microprocessor 4 is programmed in such a way so as to determine the following operation modes.

Automatic Operation

The first time that the timer receives a battery, by recognising internal data not corresponding to a pre-established code, the microprocessor 4 initialises the parameters in its internal RAM memory and enters the AUTOMATIC operation mode.

For example, the code can consist in 6 memory bytes for a total of 48 bits, thus bringing the probability of accidental start of the memory in such configuration to 1 on 2 elevated to 48.

The zero setting of the parameters involves the zero setting of the internal clock of the microprocessor and sets the watering time, that is the one between the opening and the closing of the solenoid valve, at a safety value, for instance corresponding to 5 minutes.

In the AUTOMATIC operation mode the solenoid valve is opened every 24 hours for the programmed watering time and the opening starts at the time in which the programming of the watering time (to be described hereinafter) has started, or in the absence of such time, since the moment in which the solenoid valve has been supplied by means of the battery for the first time.

When the solenoid valve is closed, the LED indicator 3 emits one short flash every two seconds; when instead the solenoid valve is open, the LED indicator emits two short flashes every two seconds, at a distance of around 100 msec from each other.

If, when in the AUTOMATIC operation mode the stop button 2 is pressed, there is no effect and the lighting of the LED indicator does not get modified.

If instead the start button 1 is pressed and released, the operation mode of VISUALISATION of the watering time is entered.

In the AUTOMATIC operation mode the solenoid valve is opened every 24 hours for the programmed watering time and the opening begins at the time in which the programming of the watering time was started, as subsequently explained.

Visualization of the Watering Time Operation

As already said, this mode of operation is entered by pressing and releasing the start button 1 while in the AUTOMATIC operation mode. The LED indicator 3 lights up and stays lit until the release of the same button.

Once the VISUALISATION operation mode has been entered, the LED indicator 3 remains off for 3 seconds in order not to mistake the various modes of operation among them.

After the first three seconds there will be a number of flashes equal to the number of the tens of minutes of the programmed watering time. Such flashes take place one every second and they last around 100 msec. Once the series of flashes relative to the tens is over, it is necessary to wait another three seconds during which the LED indicator is off in order to then have a new series of flashes equal to the number of the units of the programmed watering time. Such flashes take place one every second and they last for around 100 msec. Another three seconds of pause in which the LED indicator remains off and then the AUTOMATIC operation mode is automatically entered.

Since there is the need to indicate the value zero, this is represented by a series of four short flashes at a distance of around 100 msec from each other.

By pressing the start button 1 while in the VISUALISATION operation mode the current visualisation is interrupted and is restarted again when the same button is released.

During the VISUALIZATION mode the stop button 2 does not produce any effect if pressed and the lighting of the LED indicator 3 is not modified.

Off Operation

In case one wishes that the timer does not automatically open the solenoid valve, it is possible to set the timer in the OFF mode.

In such operation mode the LED indicator 3 remains off to indicate that the watering time has been zeroed and therefore the solenoid valve will not open automatically until the programming of a new watering time.

The OFF operation mode is entered by pressing the two buttons 1 and 2 simultaneously. By doing so, the LED indicator 3 lights up and remains lit until the release of the two buttons.

One exits the OFF mode only by proceeding with the programming of a new programming time, according to the procedures explained later, and at the same time before programming a new watering time it is necessary to enter the OFF mode.

Programming With Self-Learning of the Watering Time Operation

Its function is to set the moment and the length of the watering time. With this programming it is as if one were to open and close a faucet manually for a first time and then the faucet would repeat the opening and closing automatically exactly 24 hours after, and so on.

This mode of operation is entered from the OFF mode, by pressing the start button 1. The LED indicator 3 lights up and stays lit until the release of the same button.

When this mode of programming is entered, the solenoid valve gets opened, the internal timer 5 of the microprocessor 4 is zeroed and the microprocessor begins the count of the pulses emitted by the timer 5 (for example every second) and therefore of the watering time. The LED indicator 3 emits two short flashes every two seconds, that are at a distance of around 100 msec one from the other.

The PROGRAMMING WITH SELF-LEARNING operation mode can be quit by pressing the stop button 2. The LED indicator 3 lights up only for a short pulse of around 100 msec in order to assent, and then it turns off.

When this mode of operation is quit the solenoid valve is closed, the counting of the watering time stops and the AUTOMATIC operation mode is automatically entered.

The maximum watering time can be fixed, for instance, at 60 minutes. If the stop button 2 is not pressed within that maximum time, for distraction or any other reasons, the microprocessor automatically controls the exit from the PROGRAMMING WITH SELF-LEARNING mode and the return to the AUTOMATIC mode with a safety watering time, for instance equal to 5 minutes.

The watering time is rounded up to the next full minute, therefore even a programming of the watering time of few seconds determines a watering time of one minute.

Direct Programming of the Water Timer Operation

This mode of operation is entered from the OFF mode by pressing the start button 1. The LED indicator 3 lights up and remains lit until the release of the same button.

When the DIRECT PROGRAMMING mode of the watering time is entered, the microprocessor 4 opens the solenoid valve, it zeroes its internal timer and gives start to the counting of the watering time.

In practice, so far the timer does not distinguish if one wants to programme the watering time with self-learning or in the direct way. The difference is established when the stop button 2 is pressed.

If the stop button 2 is pressed within one minute after the start button 1 was pressed and the same stop button is maintained pressed for at least five seconds, the DIRECT PROGRAMMING of the watering time is activated without having to wait for the entire watering time to be over. At the pressing of the stop button 2 the LED indicator 3 lights up only for a short pulse of around 100 msec in order to assent, and then it turns off.

After the five seconds, without having released the stop button and by continuing to keep it pressed, the watering time counter is zeroed and the LED indicator lights up for a short pulse of around 100 msec every second. When a number of pulses equal to the number of the minutes of the watering time that one wants to be programmed is counted, the stop button is released immediately. After around three seconds the timer automatically return to the AUTOMATIC mode.

The solenoid valve remains open until the end of the programmed watering time.

What is claimed is:

1. A programmable electronic timer for the control of a solenoid valve, particularly for watering systems, comprising a start button, a stop button and a programmable processing unit, wherein said programmable processing unit is preset to determine, as a consequence to the operation on said start button, the opening of a controlled solenoid valve and the beginning of a time count and, as a consequence to the operation on said stop button, the closing of the solenoid valve and the end of said time count with memorization of the counted time for the subsequent automatic control of the opening and closing of the solenoid valve in the next days, at the same time and for the same watering time.

2. The timer according to claim 1, wherein said programmable processing unit is also preset to allow the direct programming of the watering time without having to wait until the entire watering time is over.

3. The timer according to claim 2, wherein said direct programming of the watering time is done by pressing the stop button for the desired time and with a delay lower than a pre-established maximum after a previous operation on the start button, said pressure on the stop button determining the counting of a desired number of pulses emitted at constant rate by an internal timer of said programmable processing unit, the number of the counted pulses corresponding to the programmed watering time.

4. The timer according to claim 1, wherein said programmable processing unit is preset to display the programmed watering time.

5. The timer according to claim 4, wherein said display of the programmed watering time is obtained by operating the start button.

6. The timer according to claim 1, wherein said programmable processing unit is also preset to allow a zero resetting of the programmed watering time.

7. The timer according to claim 4, wherein a zero setting of the programmed watering time is obtained by pressing said start and stop buttons simultaneously.

* * * * *